United States Patent [19]
Reeder et al.

[11] Patent Number: 5,446,530
[45] Date of Patent: Aug. 29, 1995

[54] AMPLITUDE MODULATED CORRECTED FREQUENCY MODULATED LASER

[75] Inventors: Robbin A. Reeder, Hawthorne; Kuei-Ru Chien, Cerritos, both of Calif.

[73] Assignee: Hughes Aircraft Company, Los Angeles, Calif.

[21] Appl. No.: 210,814

[22] Filed: Mar. 14, 1994

[51] Int. Cl.⁶ .............................. G01K 3/08
[52] U.S. Cl. .................. 356/5.01; 356/5.09; 356/5.11; 356/28
[58] Field of Search ............ 356/5, 28; 359/239, 359/278, 287

[56] References Cited
U.S. PATENT DOCUMENTS 4,666,295  5/1987  Duvall, III et al. ............ 356/5
5,020,062  5/1991  Cusack, Jr. et al. .............. 372/23
5,347,359  9/1994  Nourrcier, Jr. ..................... 356/5

*Primary Examiner*—Mark Hellner
*Attorney, Agent, or Firm*—Wanda K. Denson-Low; Georgann S. Grunebach

[57] ABSTRACT

A system is provided that corrects the undesirable fast power modulation observed at an output of a wideband frequency modulated (FM) laser. The correction is accomplished by applying a corrective voltage to an amplitude modulated (AM) modulator. The response of the laser is first measured to characterize the laser. Iterative predictions of appropriate voltage correction waveform, based upon the observed power modulation and the laser's response are then applied to the AM modulator to reduce the unwanted laser power modulation.

21 Claims, 7 Drawing Sheets

FIG. 5a
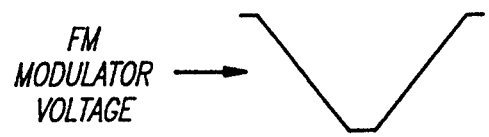
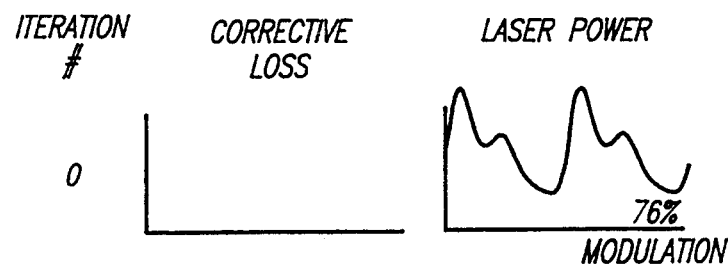
FIG. 5b
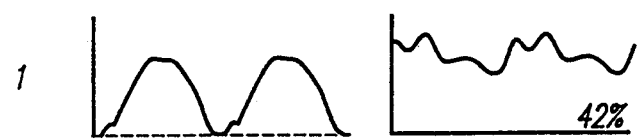
FIG. 5c
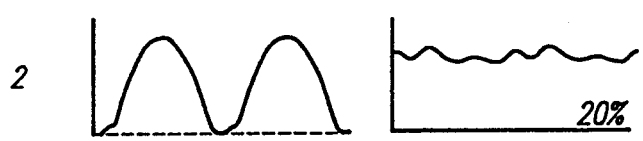
FIG. 5d
FIG. 5e
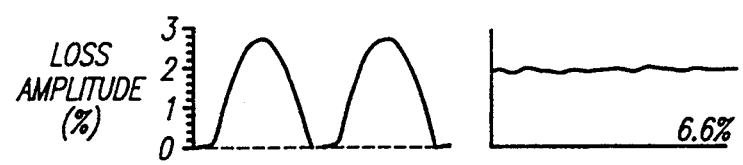
FIG. 5f

LASER'S IMPULSE/RESPONSE CHARACTERISTICS

POWER MODULATION WITHOUT CORRECTION

POWER MODULATION WITH CORRECTION

AMPLITUDE MODULATED CORRECTED FREQUENCY MODULATED LASER

FIELD OF THE INVENTION

The present invention relates to a laser radar system and more particularly a frequency modulated laser system.

BACKGROUND OF THE INVENTION

Conventional crystal modulated lasers, such as waveguide $CO_2$ lasers, have an electro-optic crystal positioned within the laser's resonant cavity to frequency modulate the laser light produced by the laser gain medium. This is accomplished by applying a periodically changing voltage to the crystal. The periodically changing voltage causes the index of refraction of the crystal to change in synchronism with the modulation voltage. This changes the effective optical length of the laser resonator, causing the frequency of the laser light to be modulated.

The linear FM chirp laser, as disclosed in U.S. Pat. No. 4,666,295, which is incorporated by reference herein, is an example of a crystal modulated laser which produces a frequency-chirped output form the $CO_2$ waveguide laser by applying voltage to an intra-cavity FM-cut CdTe electro-optic modulator. The applied voltage changes the refraction index of the crystal which, in turn, produces the FM chirp. This linear FM chirp laser system is deployed within a laser radar system to provide the system with the needed tuning range and linearity for pulse compression.

The frequency chirped output produced by the linear FM chirp systems have been showing large amounts of amplitude modulation. This is directly observable in the temporal output of such lasers and in their frequency spectrum. This phenomenon becomes more apparent in the higher gain laser systems.

AM modulation in the laser's output is caused by the loss and gain modulation driving relaxation oscillations in the resonator cavity. Relaxation oscillations are a natural damped oscillation in power that lasers exhibit if the cavity is disturbed. It is the result of the interaction of the circulating energy in the resonator with the gain of the CW pumped lasing medium.

Gain and loss modulation can be caused in a number of manners. For FM chirped lasers, the gain modulation is the direct result of the frequency chirp, since the laser gain is dependent on the optical frequency through the line shape of the gain medium. Loss modulation can be caused by stress birefringence in the electro-optic crystal, which will depend on the voltage applied to the crystal. Birefringence is a property of certain crystals characterized by a different index of refraction for different light polarizations. A highly birefringent crystal can rotate light from one polarization to a different polarization, producing a loss which reduces the laser efficiency. In the case of the linear FM chirp laser, a portion of the linearly polarized laser light within the resonant cavity becomes elliptically polarized upon passage through the FM-cut CdTe crystal. Since the elements within the resonant cavity are linearly polarization-sensitive, the elliptical polarization caused by the birefringence subjects the modulated output to an amplitude loss.

It is found in practice that these large amplitude variations cause a number of problems in the laser radar systems. For example, the variations make locking the laser frequency extremely difficult. The lock-loop within the system relies upon small amplitude changes caused by gain variations to hold the lazing frequency at line center. When the large amplitude variations caused by the crystal birefringence swampout the small amplitude changes relied upon by the lockloop, frequency control becomes difficult.

Most methods for correcting the amplitude variation in the modulated output are not practical. One method currently being used is to operate the laser while maintaining the crystal at a specific temperature. Since the birefringence within the crystal is generally unknown prior to laser operation, the procedure must be performed experimentally to determine the best working temperature. Through an exhaustive trial and error process, a very narrow temperature range, usually within a half degree, can be found in which the laser will operate with minimal amplitude fluctuation. Because this procedure is extremely time consuming and requires expensive electronic temperature feedback circuits to maintain the temperature within the required range, much of the amplitude variation goes uncorrected.

A system is disclosed in U.S. Pat. No. 5,018,153, entitled METHOD AND APPARATUS FOR CORRECTING AMPLITUDE VARIATION IN ELECTRO-OPTIC LASER SYSTEMS and assigned to the assignee of the present application, which improves the amplitude variation in the frequency modulated light produced by an electro-optic crystal laser system by compensating for the crystal birefringence within the resonant cavity. The resulting laser system can substantially reduce the amplitude dip in the modulated output without the difficulties involved in controlling the crystal's temperature.

This system although effective in some applications has limited range because it utilizes passive components. Accordingly in those systems where there are large amplitude variations on the order of 50% the above-identified system would not operate in an effective manner.

There is, therefore, a real need to provide an effective method and apparatus for correcting the losses within an electro-optic modulated laser system over a wide amplitude range. The present invention provides such a system.

SUMMARY OF THE INVENTION

The present invention corrects the undesirable fast power modulation (within the chirp) observed at the output of a wideband, high chirp rate, FM laser by applying a corrective voltage to an intracavity AM modulator. The impulse/response of the laser is first measured to characterize the laser. Iterative predictions of the appropriate voltage correction waveform, based on the observed power modulation and the laser's impulse/response, are then applied to the AM modulator to reduce the unwanted laser power modulation. Iterations are typically necessary to reduce the power modulation to acceptable levels because of the nonlinear nature of the laser and the linear nature of the corrections.

A new approach was taken to solve the AM modulation problem associated with FM modulated lasers. These lasers exhibit AM modulation because the net gain is being modulated, from both movement on the gain curve (FM chirp) and loss modulation. The AM corrected FM laser adjusts the resonator loss with an intracavity AM modulator, so that the net round trip gain is always unity, making the laser power flat with time.

In a first aspect, a system for correcting the power modulation of an FM laser is disclosed that includes a frequency modulator for modulating the frequency of the laser and an amplitude modulator for modulating the amplitude of the laser thereby correcting the power modulation of the laser.

In another aspect, a system for correcting for power modulation of an FM laser is disclosed that comprises characterizing the laser's response calculating an amplitude modulation of an output of the laser; and generating an inverted loss to correct the amplitude modulation. Finally, the calculating of the amplitude and generating the inverted loss is repeated until the amplitude modulation has been corrected.

Through the present invention, the power modulation observed in the output of FM chirped lasers that results in poor compressed pulses with enlarged sidelobes, i.e., poor system performance, is substantially reduced. In a preferred embodiment, the correction technique does not attempt to operate in real time (i.e., during the chirp), so the speed of the electronics and the algorithm processing can be relatively slow. However real time techniques can be used to improve the efficiency of system. The primary advantage of the present invention is narrower compressed pulses and reduced sidelobes, resulting in improved FM laser radar system performance.

BRIEF DESCRIPTION OF THE FIGURES

FIG. 1b is a waveform of the output of the laser of FIG. 1a.

FIG. 2b is a waveform of the output of the laser of FIG. 2a.

FIGS. 5a-5f show model waveforms that illustrate iterations of an AM correction scheme of an AM correction scheme in accordance with the present invention.

DETAILED DESCRIPTION

The present invention relates to an improvement in a frequency modulation (FM) laser radar system. The following description is presented to enable one of ordinary skill in the art to make an use the invention as provided in the context of a particular application and its requirements. Various modifications to the preferred embodiments will be readily apparent to those skilled in the art, and the generic principles defined here may be applied to other embodiments. Thus, the present invention is not intended to be limited to the embodiments shown, but is to be accorded the widest scope consistent with the principles and novel features disclosed herein.

Figure 1B:
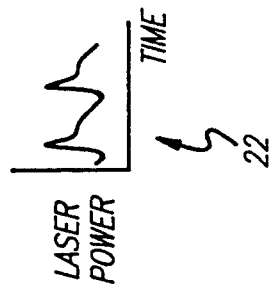
Figure 1A:
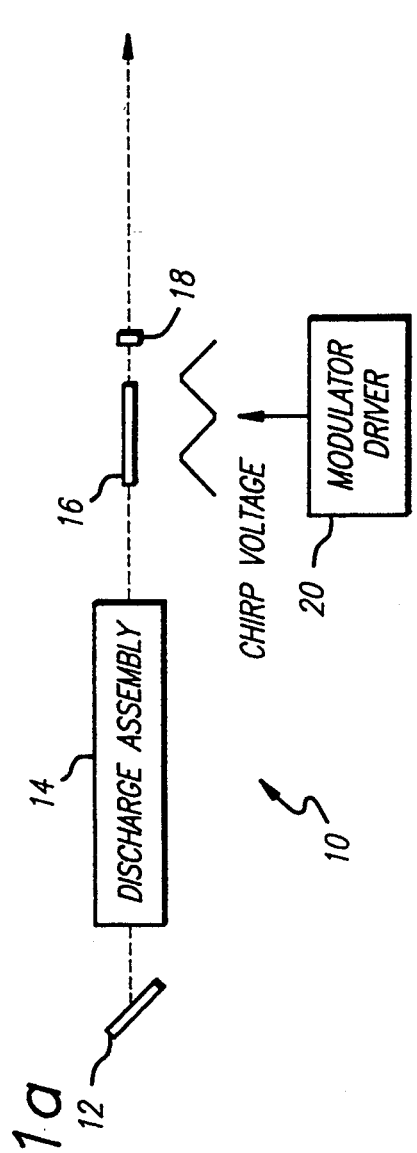
FIG. 1a is a block diagram of prior art frequency modulation ("FM") laser.

FIG. 1a shows a prior art FM laser configuration 10 with a waveform (FIG. 1b) of a typical output power modulation 22. The prior art laser system 10 comprises a grating member 12 which reflects signals from a discharge assembly 14. The discharge assembly 14 provides laser energy to a frequency modulator 16. The frequency modulated signal from frequency modulator 16 is provided to an outcoupler (OC) 18. A modulation driver 20 provides a chirp voltage to the modulator. The amount of power modulation depends on numerous factors. In general, the higher the chirp rate and the wider the chirp bandwidth, the worse the power modulation shown by waveform 22. Very little can be done to passively correct the power modulation because the drive mechanism is unpredictable (except for movement on the gain curve due to the chirp). In addition, the response of the laser to perturbations is very large, so a loss modulation of a couple of percent can drive large output power excursions.

Figure 2B:
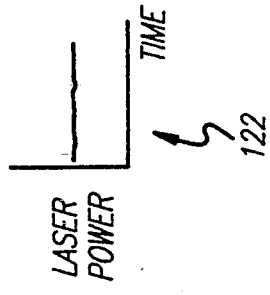
Figure 2A:
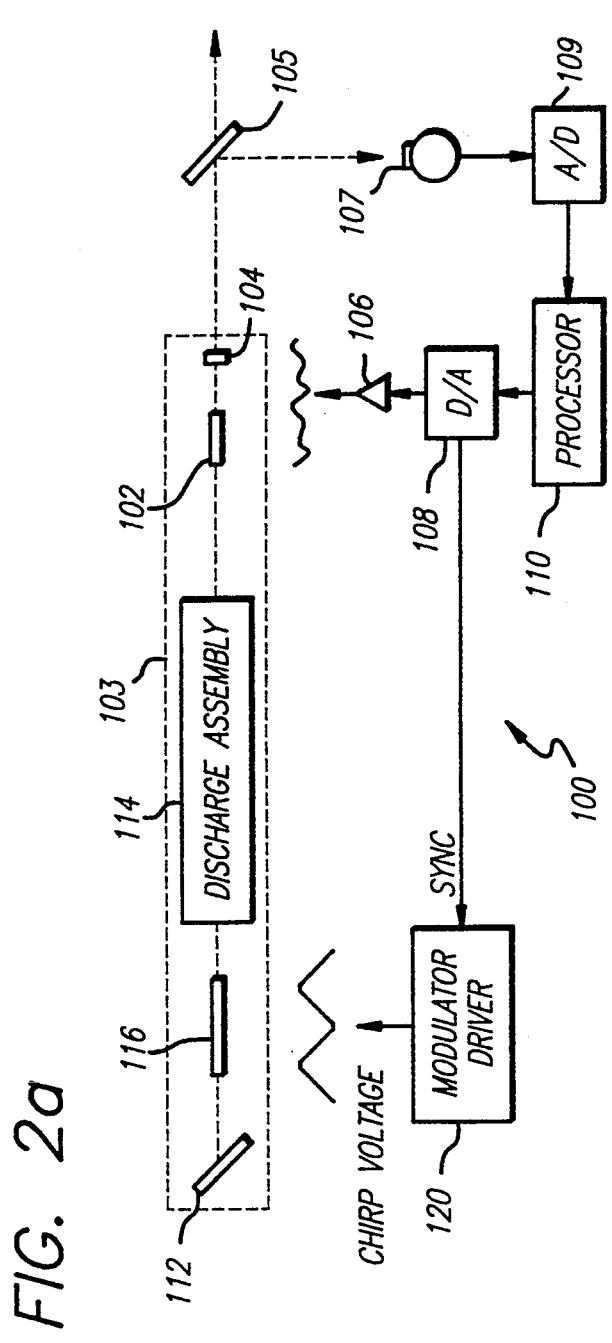
FIG. 2a is a block diagram of a FM laser in accordance with the present invention.

An amplitude modulated (AM) Corrected FM Laser system 100 in accordance with the present invention is shown in FIG. 2a with its associated waveform (FIG. 2b) of an output power modulation 122. As is seen, the output modulation is substantially reduced as indicated by waveform 122. The system comprises a discharge assembly 114 which provides a light energy to an FM modulator 116 and an AM modulator 102. The FM signal is provided to a grating 112. The AM signal is provided to an outcoupler (OC) 104. The AM modulator 102, the OC 104, the grating 112, the discharge assembly 114 and the FM modulator 116 comprise a resonator 103.

The outcoupler 104 provides the AM signal to a beam splitter 105. The beam splitter 105 splits the signal such that a portion is output to provide the laser power and a portion is provided back to a detector 107. The detector 107 provides analog signals to an A/D converter 109. The analog signals from the A/D converter 109 are provided to a processor 110. The processor provides a digital correction voltage signal to a D/A converter 108. The processor or D/A converter 108 in turn provides an analog equivalent of the correction voltage signal to an amplifier 106. The amplifier 106 in turn provides a correction voltage to the AM modulator 102 and a synchronization signal to a modulator driver 120. The modulator driver 120 provides a chirp voltage to the FM modulator 116.

For a detailed discussion of the operation of the laser system 100 refer now to the following discussion. A short AM modulator or crystal 102 is inserted into the resonator 103 to act as a loss generator. Typically a polarizer is necessary in an AM modulator, but in this case the grating 112 acts as the polarizer. The output power of the laser 100 is monitored by a suitably fast detector 107.

A correction algorithm within the processor 10 will have the laser's power modulation profile, so the analog to digital (A/D) converter 109, or equivalent, is used to digitize the output from the detector 107. This algorithm can be a variety of types and can be implemented through hardware or software. The processor 110 then calculates a corrective voltage through the use of an algorithm. Standard algorithms that can be used for this purpose are for example, an iterative algorithm or a matrix type of algorithm. The corrective voltage is then applied to the AM crystal 102 via a digital to analog (D/A) converter 108 and an amplifier 106. The amplifier 106 is necessary to generate the required AM corrective voltage. An iterative procedure necessary to completely flatten the laser's output power will be described in detail below.

FIGS. 3a–3f show waveforms that illustrate the power modulation correction method applied to a processor model of a laser system 100. The laser system 100 is characterized by its impulse/response (the lower and upper case letters refer to the various functions in the time and frequency domains, respectively). With the FM crystal 104 off, a periodic impulse (FIG. 3a) is applied to the AM crystal 102 and the response (FIG. 3b) of the laser system 100 is recorded. The laser response is the power vs. time characteristic of the laser system 102 that is caused by the impulse. The impulse does not have to look like a localized temporal pulse but can have a more general shape, as long as the frequency components of concern are included. The laser system 100 is characterized by dividing the impulse by the response in the frequency domain, i.e., the impulse is deconvolved by the response. This process can be repeated with the same or different impulses to get an averaged behavior of the laser system 100.

Figure 4:
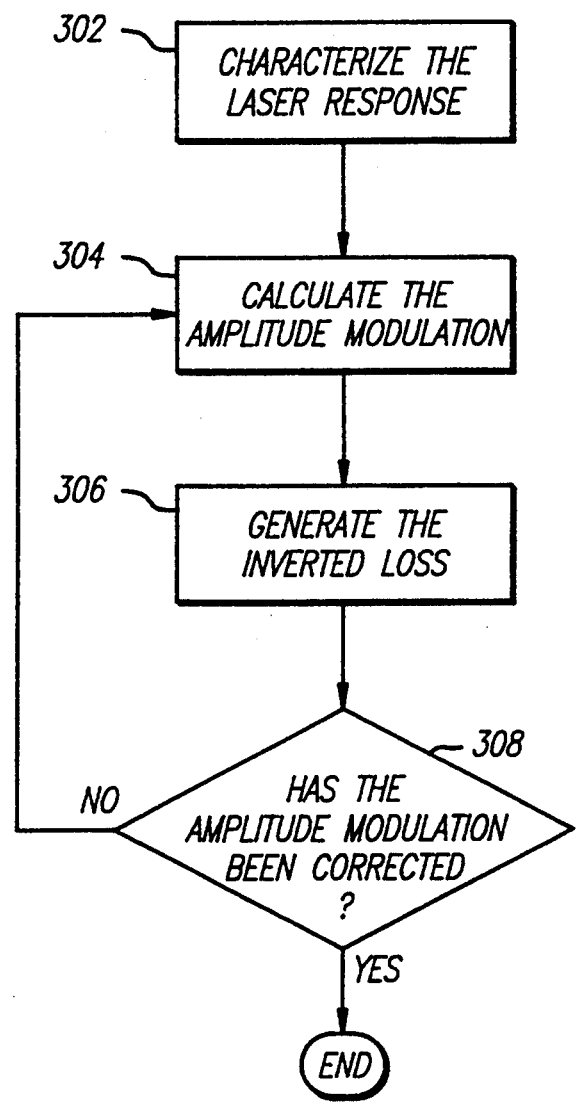
FIG. 4 is a flow chart of a first embodiment of an AM correction scheme.
Figure 6A:
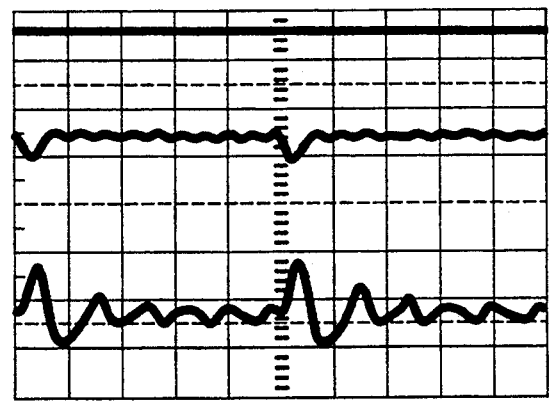
FIGS. 6a-6c show waveforms that illustrate the experimental validation of the correction scheme of FIGS. 3a-3f and 4.
Figure 6B:
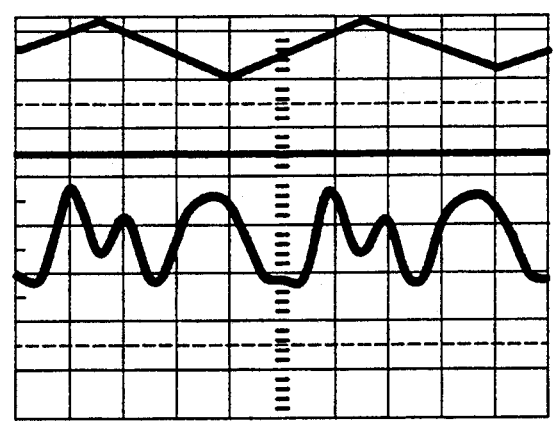
Figure 6C:
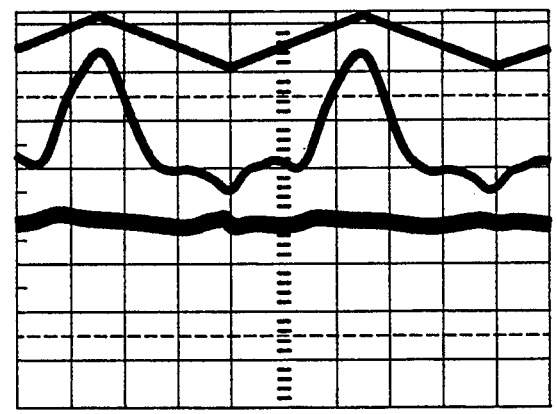

FIG. 4 shows a flow chart of the process of the present invention. Once the laser system 100 is characterized via step 302, the impulse is removed from the AM crystal 102 and the FM modulator is turned on. The observed power modulation (FIG. 3c) and the impulse/response is used to predict the temporal loss profile (FIG. 3d) that would be necessary to produce the given power modulation if the FM modulator were turned off, i.e, the mechanisms giving rise to the modulation, for example, the gain curve motion due to the frequency chirp, are converted in to an equivalent loss modulation via step 304.

Figure 3A:
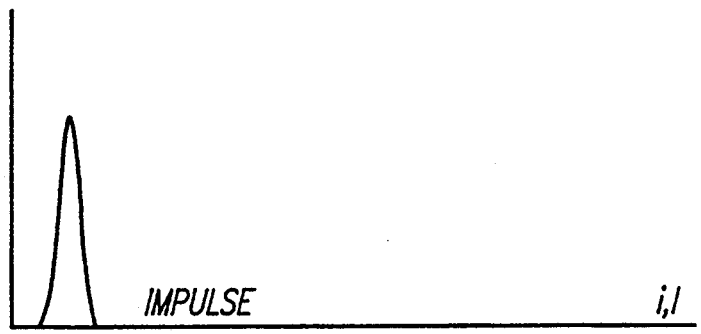
FIGS. 3a-3f show model waveforms that illustrate a first embodiment of an amplitude modulation (AM) correction scheme in accordance with the present invention.
Figure 3B:
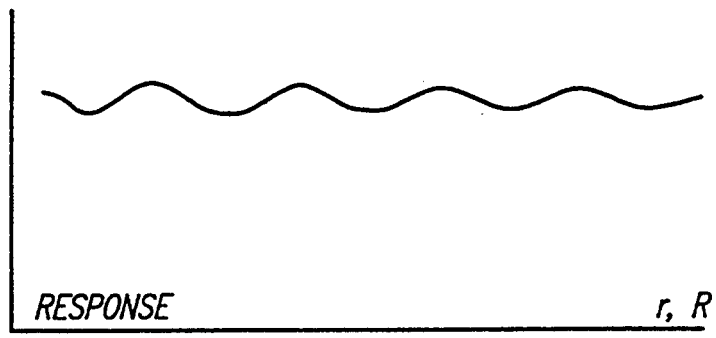
Figure 3C:
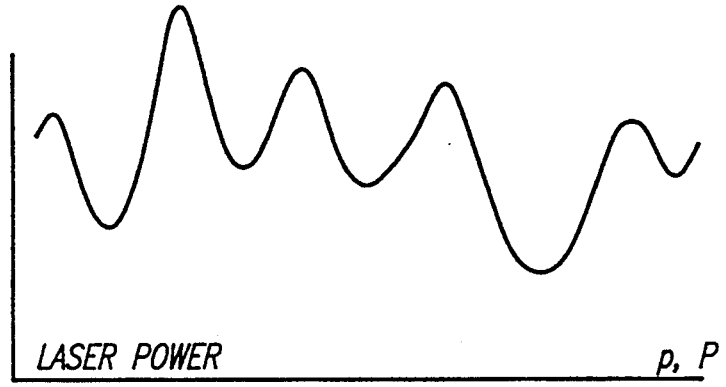
Figure 3D:
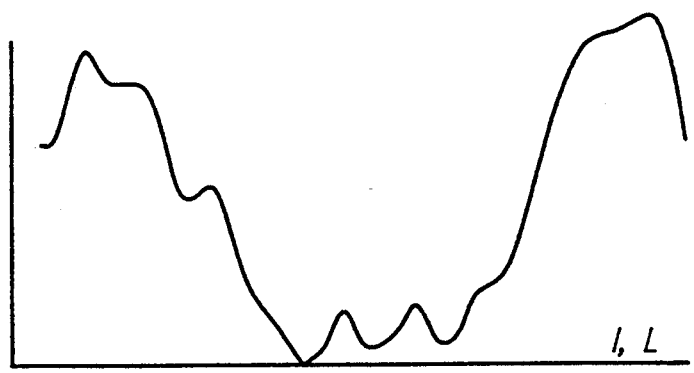
Figure 3E:
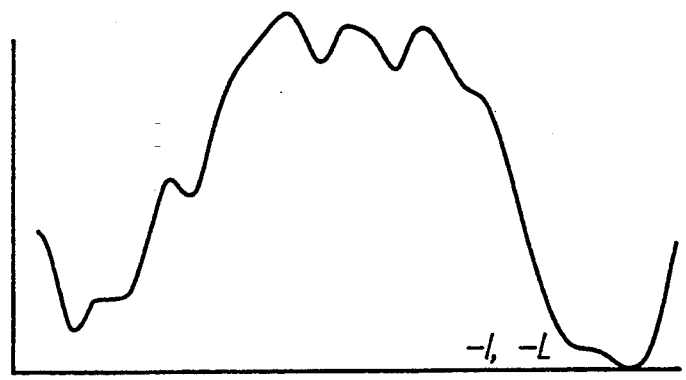
Figure 3F:
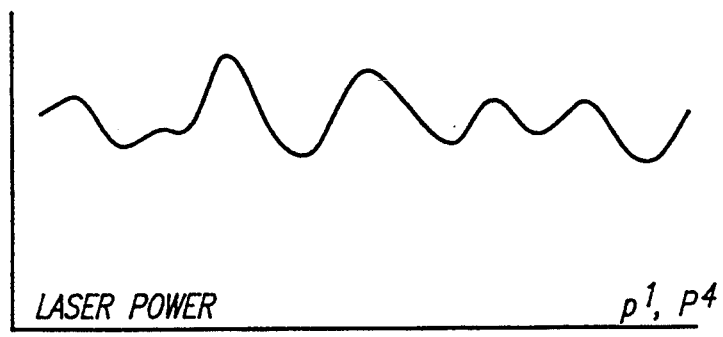

This equivalent loss modulation can be made flat by adding an inverted copy of itself, i.e., by generating this inverted loss with the AM modulator (FIG. 3e) via step 306 This process can be iterated via step 308 by returning to the calculation step 304. One iteration is shown in FIGS. 3a–3f. Since the laser has a nonlinear response, the power modulation is reduced but not eliminated (FIG. 3f). Further iterations of the equivalent loss calculation are necessary using the residual power modulation to predict the additional corrective loss.

FIGS. 5a–5f show multiple corrective iterations on a processor model of the laser system. In this case, the initial laser power modulation is due to motion on the gain curve during the frequency chirp. Each iteration is making a linear calculation of what additional loss is necessary to make the power flat with time. If the laser model was linear, rather than nonlinear, then only one iteration would be necessary. Further iterations will continue to flatten the laser power. The rate at which the loss converges to the correct shape is probably faster than on the real laser.

The correction technique of the present invention appears to be the most efficient way to cause wideband FM lasers to behave over a wide range of temperatures, because other methods seem to be very temperature sensitive. Since the laser is characterized or can be re-characterized for whatever final environmental condition encountered, this correction technique substantially expands the operating range of wideband FM chirped lasers.

The correction scheme can also effectively predict the correction voltage if the initial laser power modulation is as large as 70% of the laser power. The technique works very effectively if the bandwidth of the chirp is reduced, thereby reducing the amplitude of the power modulation. After the power modulation is corrected, the bandwidth can be increased and correction iterations can continue. Other variations of the correction prediction technique may involve correcting particular frequency components of the power modulation one at a time, or in some other manner. Other predictive techniques may also exist, but the principle utilized with such techniques would be within the spirit and scope of the present invention.

Although the above-identified correction scheme operates very effectively to limit modulation, other methods of calculating the corrective voltage can be used. Another scheme that could be advantageously utilized to limit modulation loss is described below.

Figure 7:
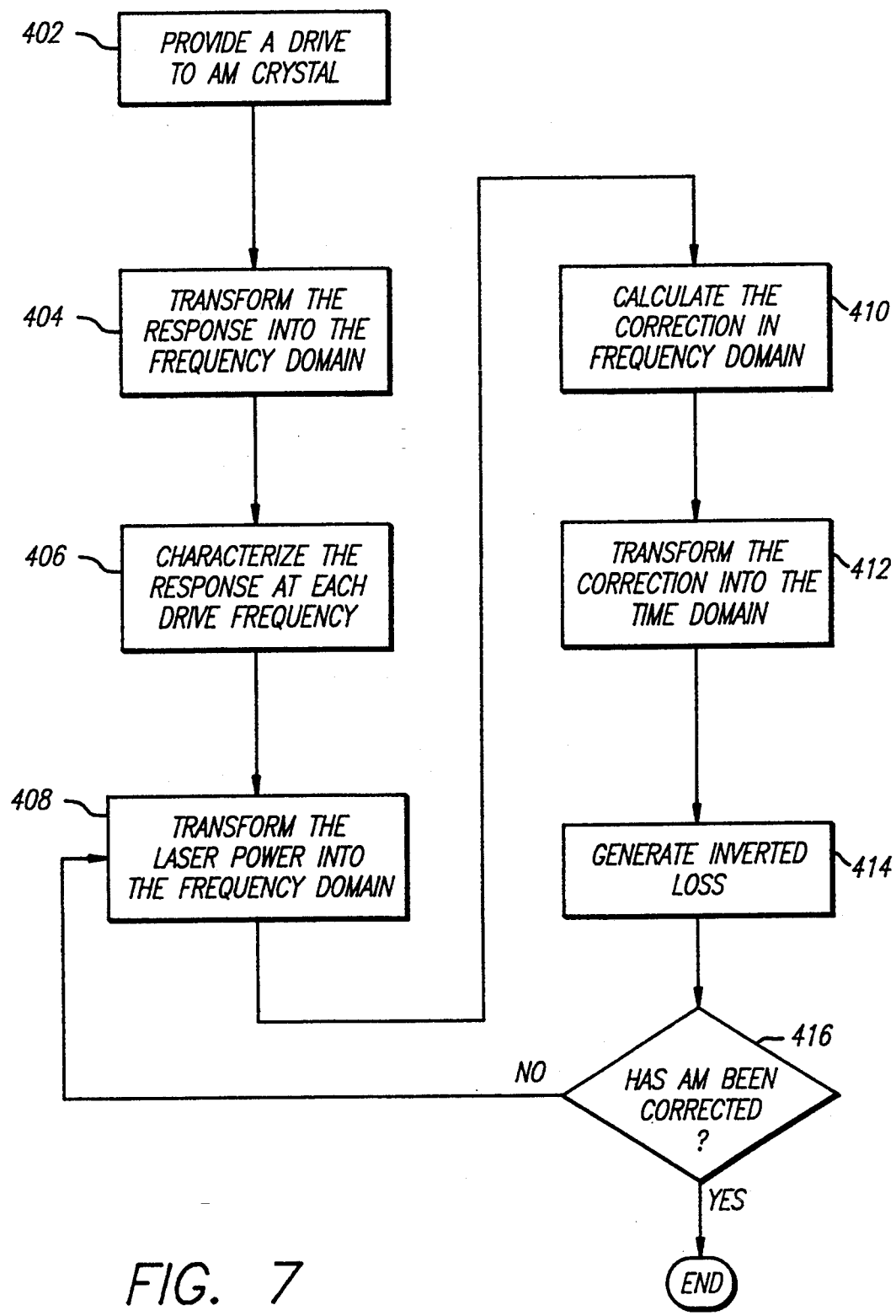
FIG. 7 is a flow chart of a second embodiment of an AM correction scheme in accordance with the present invention.

Rather than determining the response of the laser to a generalize impulse, it is possible to characterize the laser individually at each harmonic of the FM drive waveform. Referring now to FIG. 7, what is shown is a flow chart of second embodiment of a correction scheme for limiting the loss modulation. Accordingly, a sinusoidal drive waveform is provided to the AM modulators at the fundamental frequency, the second harmonic, etc. via step 402. For each case, the response of the laser is recorded and transformed into the frequency domain via step 404.

Since the laser response is nonlinear, higher order harmonics are observed in each case, i.e., a drive at the second harmonic will generate second, fourth, sixth and higher harmonics. The laser is finally characterized by a matrix that contains the responses at each possible drive frequency via step 406. At correction time, the laser power is digitized and transformed into the frequency domain via step 408, the matrix is used to calculate the correction in the frequency domain via step 410, and the correction is transformed back to the time domain via step 412, where it is added to the existing correction waveform to produce the new improved correction waveform via an iterative process shown via steps 414 and 416.

The advantage of the matrix correction scheme is that it accounts for the fact that the low harmonics will generate higher harmonics in the laser. The impulse/response deconvolution scheme described with reference to FIGS. 3a–f and 4 does not account for this. For instance, any fourth harmonic in the response is assumed to be generated by the fourth harmonic in the response, though some of it is actually coming from the first and second harmonic in the impulse, due to the nonlinear nature of the laser response. Thus, the matrix method would have some advantages over the above-identified scheme.

Once the AM modulator is placed within the laser resonator, a number of techniques can be used to correct the laser's power modulation, all involving a voltage applied to the AM modulator. The primary correction technique in the preferred embodiment does not attempt to work in real time (i.e., during the chirp), so the speed of the electronics and the algorithm can be relatively slow. A real time corrective scheme would attempt to sense an output power change and would immediately change the AM crystal voltage to counteract the laser power change. Hence, real time active techniques requiring much faster electronics could be utilized and their use would be within the spirit and scope of the present invention.

Although the present invention has been described in accordance with the embodiments shown, one of ordinary skill in the art will recognize that there could be variations to the embodiment and those variations would be within the spirit and scope of the present invention. Accordingly, many modifications may be made by one of ordinary skill without departing from the spirit and scope of the present invention, the scope of which is defined solely by the following claims.

What is claimed is:

1. A system for correcting power modulation in a frequency modulated laser comprising:
   characterization means operable to characterize the frequency modulated laser.
   frequency modulation means responsive to the laser for modulating the frequency of the laser; and
   amplitude modulation means responsive to the laser for modulating the amplitude of the laser, by application of a corrective voltage, said corrective voltage generated in response to the characterization of the frequency modulated laser, thereby correcting the power modulation of the laser.

2. The system of claim 1 which further comprises:
   Feedback means coupled between the frequency modulation means and the amplitude modulation means for interactively applying the corrective voltage, thereby correcting for the power modulation of the laser.

3. A system for correcting power modulation in a frequency modulated laser comprising:
   frequency modulation means responsive to the laser for modulating the frequency of the laser;
   amplitude modulation means responsive to the laser for modulating the amplitude of the laser, thereby correcting the power modulation of the laser;
   feedback means coupled between the frequency modulation means and the amplitude modulation means for interactively correcting for the power modulation of the laser' wherein said feedback means further comprises;
   beamsplitter means for receiving the A/M modulated signal and providing an output signal,
   detector means for detecting the output signal from the beamsplitter means and providing an analog signal,
   analog to digital (A/D) connector means for receiving the analog signal and converting the analog signal to a digital signal;
   processor means for receiving digital signals and providing a digital signal representing a correction voltage; and
   digital to analog (D/A) converter means for receiving the digital correction voltage and providing a correction voltage to the A/M means.

4. A system for correcting power modulation in a frequency modulated laser comprising:
   frequency modulation means responsive to the laser for modulating the frequency of the laser;
   amplitude modulation means responsive to the laser for modulating the amplitude of the laser, thereby correcting the power modulation of the laser;
   feedback means coupled between the frequency modulation means and the amplitude modulation means for interactively correcting for the power modulation of the laser wherein said feedback means further comprises;
   beamsplitter means for receiving the A/M modulated signal and providing an output signal,
   detector means for detecting the output signal from the beamsplitter means and providing an analog signal,
   analog to digital (A/D) converter means for receiving the analog signal and converting the analog signal to a digital signal,
   processor means for receiving digital signals and providing a digital signal representing a correction voltage; and
   digital to analog (D/A) converter means for receiving the digital correction voltage and providing a correction voltage to the A/M means wherein said D/A converter means further comprises;
   a D/A converter, and
   an amplifier coupled to the D/A converter.

5. A system for correcting power modulation in a frequency modulated laser comprising:
   frequency modulation means responsive to the laser for modulating the frequency of the laser;
   amplitude modulation means responsive to the laser for modulating the amplitude of the laser, thereby correcting the power modulation of the laser, wherein said amplitude modulation means further comprises, an A/M modulator for receiving light signals from the A/M modulator;
   feedback means coupled between the frequency modulation means and the amplitude modulation means for interactively correcting for the power modulation of the laser wherein said feedback means further comprises:
   beamsplitter means for receiving the A/M modulated signal and providing an output signal;
   detector means for detecting the output signal from the beamsplitter means and providing an analog signal;
   analog to digital (A/D) converter means for receiving the analog signal and converting the analog signal to a digital signal;
   processor means for receiving digital signals and providing a digital signal representing a correction voltage; and
   digital to analog (D/A) converter means for receiving the digital correction voltage and providing a correction voltage to the A/M means.

6. A system for correcting power modulation in a frequency modulated laser comprising:
   frequency modulation means responsive to the laser for modulating the frequency of the laser wherein the F/M modulation means further comprises, an F/M modulator for receiving light energy; and a light grating for receiving light signals from the F/M modulation;
   amplitude modulation means responsive to the laser for modulating the amplitude of the laser, thereby correcting the power modulation of the laser;
   feedback means coupled between the frequency modulation means and the amplitude modulation means for interactively correcting for the power modulation of the laser wherein said feedback means further comprises;
   beamsplitter means or receiving the A/M modulated signal and providing an output signal,
   detector means for detecting the output signal from the beamsplitter means and providing an analog signal, analog to digital (A/D) converter means for receiving the analog signal and converting the analog signal to a digital signal, processor means for receiving digital signals and providing a digital signal representing a correction voltage; and digital to analog (D/A) converter means for receiving the digital correction voltage and providing a correction voltage to the A/M means.

7. A system for correcting power modulation in a frequency modulated laser comprising:

frequency modulation means responsive to the laser for modulating the frequency of the laser;

amplitude modulation means responsive to the laser for modulating the amplitude of the laser, thereby correcting the power modulation of the laser;

feedback means coupled between the frequency modulation means and the amplitude modulation means for interactively correcting for the power modulation of the laser wherein said feedback means further comprises;

beamsplitter means for receiving the A/M modulated signal and providing an output signal, detector means for detecting the output signal from the beamsplitter means and providing an analog signal, analog to digital (A/D) converter means for receiving the analog signal and converting the analog signal to a digital signal, processor means for receiving digital signals and providing a digital signal representing a correcting voltage, digital to analog (D/A) converter means for receiving the digital correction voltage and providing a correction voltage to the A/M means; and a modulator driver means for receiving a synchronization signal from the amplifier and provides a chirp voltage to the F/M modulator means.

8. A system for correcting power modulation of a frequency modulated laser, the system comprising:

means for characterizing the laser's response;

means responsive to the characterizing means for calculating an amplitude modulation of an output of the laser; and means responsive to the calculating means for generating an inverted amplitude modulation loss to correct the amplitude modulation.

9. The system of claim 8 in which the characterizing means includes characterizing the impulse/response of the laser.

10. The system of claim 8 in which the characterizing means further includes:

means for providing a drive to the amplitude modulation to generate a time domain response;

means responsive to the providing means for transforming the time domain response into a frequency domain response; and means responsive to the transforming means for characterizing the frequency domain response at a plurality of harmonic frequencies.

11. A laser system comprising:

a discharge assembly for providing light energy, frequency modulation (FM) means for receiving the light energy from the discharge assembly and providing a frequency modulated signal;

amplitude modulated (AM) means for receiving the light energy from the discharge assembly and providing an amplitude modulated signal;

(a) beam splitter means for receiving the AM modulated signal and providing an output signal;

(b) detector means for detecting the output signal from the beam splitter means and providing an analog signal;

(c) analog to digital (A/D) converter means for receiving the analog signal and converting the analog signal to a digital signal, (d) processor means for receiving digital signals and providing a digital signal representing a correction voltage; and (e) digital to analog (D/A) converter means for receiving the digital correction voltage and providing a correction voltage to the AM means.

12. The system of claim 11 in which D/A converter means includes:

a D/A converter; and an amplifier coupled to the D/A converter.

13. The system of claim 11 in which the AM modulated means includes:

an AM modulator for receiving the light energy and;

outcoupler for receiving light signals from the AM modulator.

14. The system of claim 11 in which the FM modulation means includes:

a FM modulator for receiving light energy; and a light grating for receiving light signals from the FM modulator.

15. The system of claim 11 which further includes a modulator driver means for receiving a synchronization signal from the amplifier and provides a chirp voltage to the FM modulator means.

16. The system of claim 11 in which the processor means includes:

means for characterizing the laser's response;

means for calculating the amplitude modulation responsive to the characterizing means; and means responsive to the calculating means for generating an inverted loss to correct the amplitude modulation from the calculating means.

17. The system of claim 16 in which the AM modulator comprises an AM crystal.

18. An amplitude modulated (AM) corrected frequency modulated (FM) laser system comprising:

a discharge assembly for providing light energy, frequency modulation (FM) means for receiving the light energy from the discharge assembly and providing a frequency modulated signal, the FM modulation means including a FM modulator for receiving light energy, and a light grating for receiving light signals from the FM modulator;

amplitude modulated (AM) means for receiving the light energy from the discharge assembly and providing an amplitude modulated signal, the AM means including an AM modulator for receiving the light energy and an outcoupler for receiving light signals from the AM modulator;

beam splitter means for receiving the AM modulated signal and providing an output signal;

detector means for detecting the output signal from the beam splitter means and providing an analog signal;

analog to digital (A/D) converter means for receiving the analog signal and converting the analog signal to a digital signal, processor means for receiving digital signals and providing a digital signal representing a correction voltage, the processor means including means for characterizing the laser's response;

means for calculating the amplitude modulated signal responsive to the characterizing means; and means responsive to the calculating means for generating the digital voltage to correct the amplitude modulation from the calculating means;

digital to analog (D/A) converter means for receiving the digital correction voltage and providing a correction voltage to the AM means, the D/A converter means including a D/A converter; and an amplifier coupled to the D/A converter; and a modulator driver means for receiving a synchronization signal from the amplifier and providing a chirp voltage to the FM modulator means.

19. A method for correcting power modulation of a frequency modulated laser, the method comprising the steps of:
  (a) characterizing the laser's response;
  (b) calculating an amplitude modulation of an output of the laser;
  (c) generating an inverted amplitude modulation loss to correct the amplitude modulation;
  (d) repeating steps b and c until the amplitude modulation has been inverted.

20. The method of claim 19 in which the characterizing step includes characterizing the impulse/response of the laser.

21. The method of claim 19 in which the characterizing step further includes the steps of:
  (a) providing a drive to the amplitude modulation to generate a time domain response;
  (b) transforming the time domain response into a frequency domain response; and
  (c) characterizing the frequency domain response at a plurality of harmonic frequencies.

* * * * *